United States Patent [19]

Schaub et al.

[11] Patent Number: 4,491,688

[45] Date of Patent: Jan. 1, 1985

[54] ELECTRONIC STYLUS FOR DIGITIZING DEVICES

[75] Inventors: Dietmar Schaub, Lahr; Gert Heups, Schwanau, both of Fed. Rep. of Germany

[73] Assignee: Albert Nestler GmbH, Fed. Rep. of Germany

[21] Appl. No.: 486,824

[22] Filed: Apr. 20, 1983

[30] Foreign Application Priority Data

Apr. 20, 1982 [DE] Fed. Rep. of Germany ....... 3214426

[51] Int. Cl.³ .............................................. G08C 21/00
[52] U.S. Cl. ....................................... 178/18; 33/1 M
[58] Field of Search ................... 178/18, 19; 33/1 M; 346/139 C

[56] References Cited

U.S. PATENT DOCUMENTS 4,184,044  1/1980  Zwerenz ................................ 178/18
4,393,268  7/1983  Guedi et al. ......................... 178/18

Primary Examiner—Stafford D. Schreyer
Attorney, Agent, or Firm—Antonelli, Terry & Wands

[57] ABSTRACT

The invention relates to an electronic stylus for digitizing devices usable for designing and digitizing. A fine-lead unit 1 with lead storage chamber 8 and advanceable graphite lead 7 is arranged in a carrier tube 2; the lead guide means 32 is surrounded by a detachable induction coil 31, by means of which the digitizing device is activated.

A combined contact and on-off switch, constructed with the use of a flexible circuit board and seated on the carrier tube, is actuated with the aid of a longitudinally displaceable tubular handle 3 and a turning ring 23 mounted thereon.

9 Claims, 9 Drawing Figures

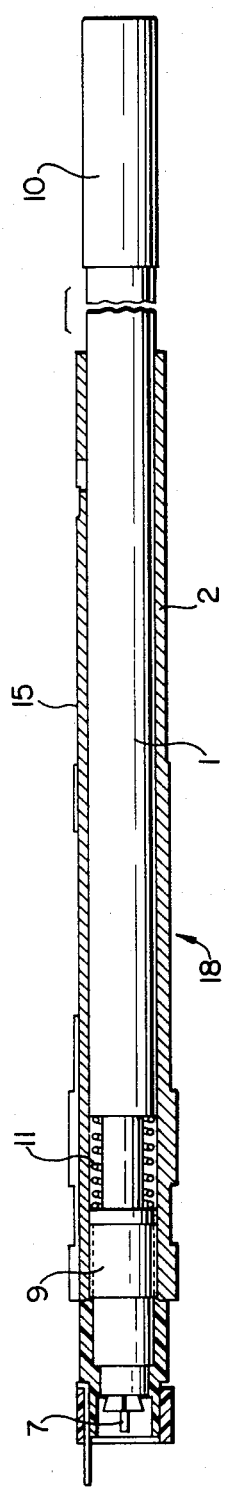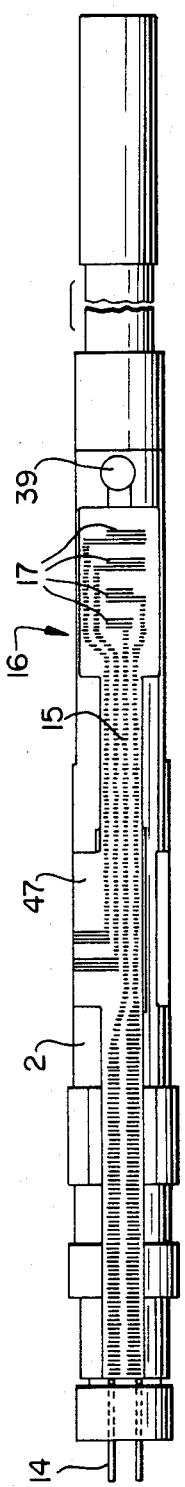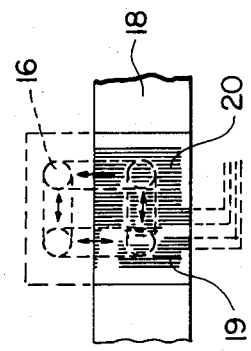

ELECTRONIC STYLUS FOR DIGITIZING DEVICES

The known electronic styluses contain a small section of longitudinally displaceable marker pen surrounded by an induction coil activating the electronic console. This induction coil is placed under current as soon as, and as long as, a contact switch installed in the stylus is actuated by pressing the marker pen on a drawn line.

In all conventional designs of the electronic styluses, the marker pen is a commercially available, exchangeable ball-point pen insert. While tracing the lines of the drawing during digitizing, these lines are marked by the ball-point pen so that the already digitized portions of the drawing are recognizable. The finished digitized drawing has become unusable due to the markings.

An installation for digitizing, consisting of digitizing mechanism, computer, screen, and plotter, is complicated and expensive; only those technical drawings finished in design can be digitized with the aid of this installation. Even insignificant designing work is impossible to conduct on the console of the digitizing device because the ball-point pen insert of the stylus cannot be used for drawing on transparent paper since such paper does not absorb ball-point pen ink. No designing can be executed, either, on white drafting paper, since the ball-point pen ink cannot be erased—no design engineer can work without eraser.

Heretofore, no solution has been found by replacing the ball-point pen insert of the stylus by a pencil, for example, so that designing can be carried out, because a pencil, in contrast to a ball-point pen insert, changes its length during use. This change in length appeared to be an insurmountable obstacle for exchanging the longitudinally displaceable ball-point pen insert against another, more suitable marking means on account of the absolute necessity of having the contact switch installed in the stylus in operable condition. The present invention is based on this problem.

The invention has the object of fashioning a stylus for digitizing devices in such a way that not only digitizing but also designing can be carried out with the aid of such stylus.

Starting with a stylus of the aforedescribed type, the posed object is attained in that the marker pen is fashioned as a pencil insert with advanceable graphite lead; that the bobbin carries a plug-in rim, has electric sockets, contains a lead brake, and carries a lead guide; that a tubular handle is provided which actuates the contact switch and is longitudinally displaceable against the bias of a spring, this tubular handle surrounding the stylus at least partially along its length; and that a turning ring is rotatably attached to the tubular handle, this ring actuating an electric on-off switch. By the use of a pencil insert with advanceable graphite lead, the stylus of this invention becomes a tool for the construction engineer with which he can create, in the customary way, his pencil drawings on tracing paper. Digitizing can be prevented by means of the included on-off switch during designing, in that the function of the contact switch is rendered inoperative. This process can be easily initiated by moving a finger of the hand guiding the stylus during designing or digitizing. The stylus of this invention makes it possible to save the working step of a subsequent digitizing of the completed drawing, since with skilled manipulating the stylus can be used for simultaneous designing and digitizing.

Advantageously, the pencil insert is a fine-lead unit with a lead storage chamber as well as a sliding and clamping device. The use of a fine-lead unit of a well-proven, commercially available fine-lead pencil ensures high operating safety and makes it possible to offer the stylus of this invention without problems in various line thicknesses.

For structural reasons, the fine-lead unit is advantageously housed in a carrier tube.

A centering sleeve carrying plug contacts is suitably mounted at one end of the carrier tube, this sleeve being made of an electrically insulating material.

According to another feature of the invention, four electric conductor paths are attached in an insulated fashion on the carrier tube, these paths emanating from a contact plate with four contacts; two of these conductor paths are connected to the plug contacts.

In an especially advantageous embodiment of the invention, the on-off switch is combined with the contact switch and is made up of two broadened portions of two conductor paths lying side-by-side with a mutual spacing; an electrically conductive contact plate slides over these conductor paths, this plate being housed in a contact sleeve of insulating material attached to the turning ring. The idea of combining the two switches structurally provides a relatively easy solution for the problems occurring due to the very much restricted space within the stylus.

Advantageously, a cable clamp U-shaped in cross section is placed on the carrier tube in the zone of the contact plate and encompasses the carrier tube; this cable clamp is provided with two longitudinal slots. A terminal can be inserted in this cable clamp wherein the electric connection lines are soldered to a flexible circuit board placed around a pressure roll; the latter is mounted in a circuit board clamp with two longitudinal grooves, and the pressure roll carries a longitudinal recess wherein a rod is inserted made of elastic foam material.

The invention will be explained hereinbelow in one embodiment with reference to the appended drawings wherein:

FIG. 2 shows the carrier tube of the stylus according to FIG. 1 with a centering sleeve and a fine-lead unit in a longitudinal section;

FIG. 3 shows the carrier tube with centering sleeve and fine-lead unit according to FIG. 2 with conductor paths in top view;

FIG. 4 shows the broadened portions of the conductor paths pertaining to the contact switch and the on-off switch, in a top view;

Figure 1:
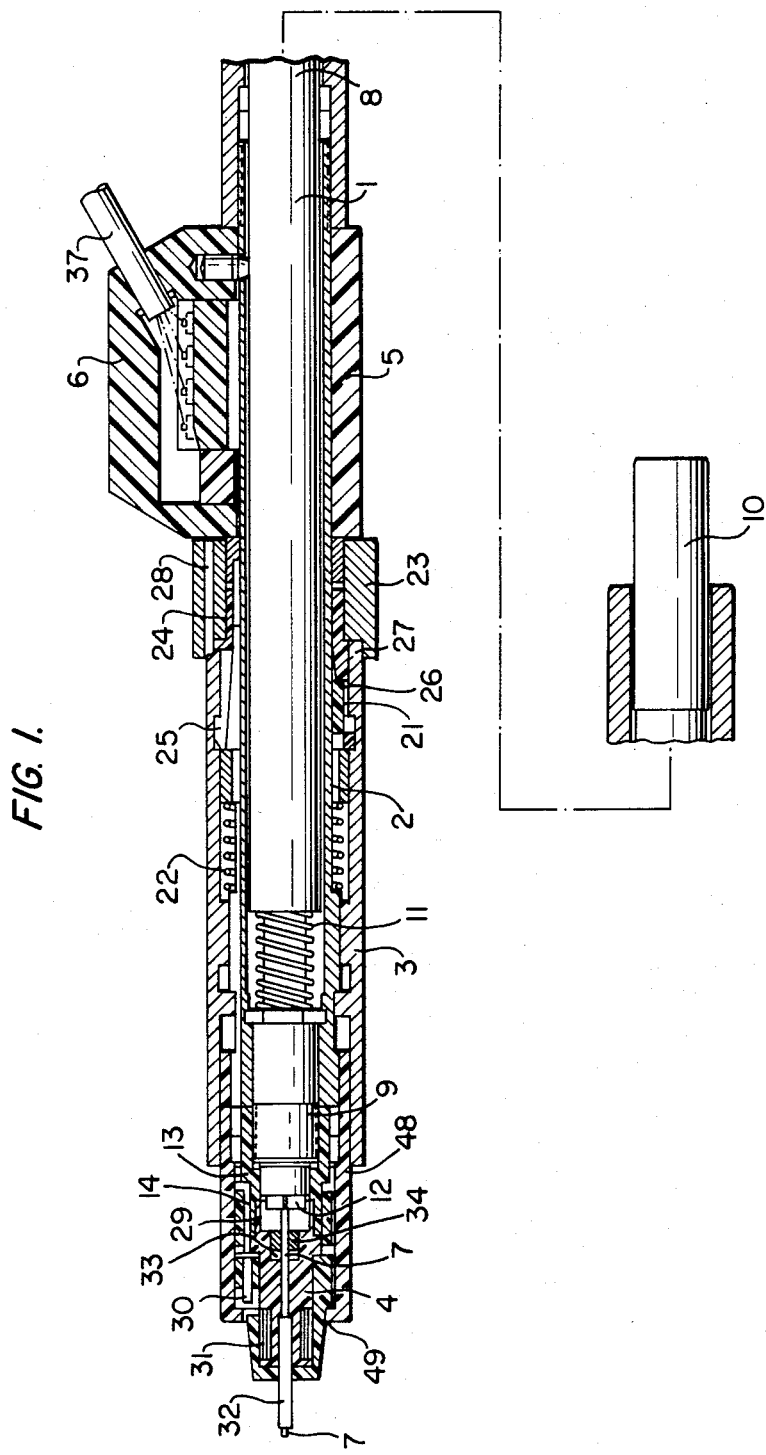
FIG. 1 shows an electronic stylus in a longitudinal section.

An electronic stylus for digitizing devices according to the invention consists (see FIG. 1) essentially of a fine-lead unit 1, a carrier tube 2, a tubular handle 3, a bobbin 4, a cable clamp 5, and a cable terminal 6.

The fine-lead unit 1 is a pencil insert with an advanceable graphite lead 7, with a lead storage chamber 8, as well as a sliding and clamping means 9. The lead storage chamber 8, accommodating the reservoir of advanceable, thin graphite leads 7, is sealed by a removable cap 10. In the fine-lead unit 1, the lead storage chamber 8 is displaceable against the effect of a compression spring 11 with respect to the sliding and clamping means 9, the latter being equipped with a three-jaw mounting 12. By depressing the cap 10, the graphite lead 7 is advanced a certain distance by the sliding and clamping means 9.

The fine-lead unit 1 is seated in the carrier tube 2 of metal and is attached at that location in the zone of the sliding and clamping means 9. A centering sleeve 13 consisting of an electrically insulating material is provided at the front end of this carrier tube 2 and carries two electric plug contacts 14. The carrier tube 2 has a flattened portion at its jacket in the longitudinal direction, four electric conductor paths 15 (see FIG. 3) being attached thereon in an insulated fashion; these conductor paths emanate from a contact plate 16 with four electric contacts 17. Two of these conductor paths 15 are electrically connected to the two plug contacts 14.

The electronic stylus is equipped with an electric contact switch and an on-off switch 18 (see FIG. 4), these switches being formed by two broadened portions 19 and 20 of two conductor paths 15. These two widened portions 19 and 20, consisting of the same metal as the conductor paths 15, are curved cylindrically and attached in an insulated fashion to the carrier tube 2. A developed projection of the broadened portions 19 and 20 into a plane is indicated in dashed lines in FIG. 4. The switching element of this combined contact and on-off switch 18 is (FIG. 1) an electrically conductive, small, flat, circular-cylindrical contact pellet 21 which—as indicated with dot-dash lines in FIG. 4—slides over the two broadened portions 19 and 20 (corresponding to the four arrows illustrated in the drawing) and, depending on its position, electrically connects or disconnects these broadened portions.

The tubular handle 3 is arranged over the carrier tube 2 and is longitudinally displaceable a certain distance against the bias of a coil spring 22 (FIG. 1); this tubular handle surrounds the stylus over about half its length. A turning ring 23 is rotatably attached to the tubular handle 3 used to grip the stylus during drawing and/or digitizing by thumb, index finger, and middle finger of one's hand—see FIG. 1. A contact sleeve 24 made of an electrically insulating material is attached to the turning ring 23 and is connected with elastic spreader fingers 25 to the tubular handle 3. A circular recess 26 is provided in one of these spreader fingers 25, the contact plate 21 being seated in this recess.

The function of the combined contact and on-off switch 18 is as follows. The tubular handle 3 has a shoulder 27 at its rim, encompassing an edge cutout, and a pin 28 engages into this edge cutout, the pin being arranged in the turning ring 23. Thereby the rotary movement of the latter is limited to an angle of about 90 degrees. The arrangement is such that, in one rotary end position of the turning ring 23, the contact pellet 21, during longitudinal displacement of the tubular handle 3, slides exclusively over one broadened portion 20 (see FIG. 4), while, in the other rotary end position, the contact plate 21 lies over both broadened portions 19 and 20. As a consequence thereof, in one rotary end position of the turning ring, the "contact switch" is not actuated during the longitudinal displacement of the tubular handle 3, whereas, in the other rotary position, with each longitudinal displacement, the switch electrically connects the two broadened portions 19 and 20 with each other (by means of the contact plate 16). By twisting the turning ring 23, the "on-off switch" is accordingly activated while, by shifting the tubular handle 3, the "contact switch" is activated, which is required for digitizing.

The bobbin 4 consists of a suitable insulating material and carries a plug-in rim 29, with the aid of which it is plugged into the centering sleeve 13. On one side of the bobbin 4, two electric sockets 30 are inserted to which are soldered the ends of the winding of an induction coil 31—with the aid of this induction coil, a digitizing device is activated.

The bobbin 4 is detachable so that the sliding and clamping means 9 of the fine-lead unit 1 is readily accessible for cleaning purposes and in case of disturbances in the feeding of the graphite leads 7.

A lead guide 32 in the form of a thin metal tube is arranged in the longitudinal axis of the bobbin 4; the graphite lead 7 is guided in this metal tube to be longitudinally displaceable. The bobbin 4 exhibits a rearward blind bore 33 in which a lead brake 34—a short piece of a small tube made of a rubber-elastic material—is inserted.

Figure 5:
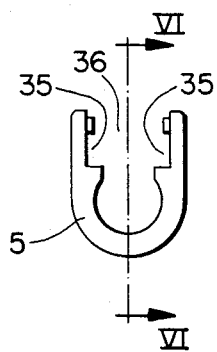
FIG. 5 shows a cable clamp for the stylus of FIG. 1 in frontal view.
Figure 6:
FIG. 6 shows the cable clamp of FIG. 5 in a longitudinal section taken along line VI—VI in FIG. 5.

The cable clamp 5 consists, for example, of a suitable synthetic resin and is seated on the carrier tube 2 in the zone of the contact plate 16—see FIG. 1. This cable clamp 5 is fashioned to be U-shaped in cross section (see FIG. 5) and is provided with two longitudinal slots 35. The cable clamp 5 is mounted so that the contact plate 16 lies in its opening 36.

Figure 7:
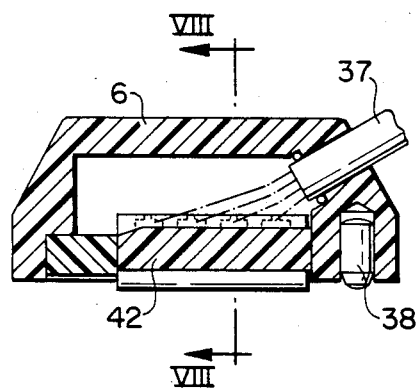
FIG. 7 shows a terminal pertaining to the stylus according to FIG. 1 in a longitudinal sectional view.

The cable terminal 6 receiving the electric connection lines 37 leading to the digitizing device (not shown), is inserted in the cable clamp 5, FIG. 1. A detent pin 38 (see FIG. 7), engaging into an indentation 39 in the carrier tube 2, retains the terminal 6.

A circuit board clamp 40 (FIG. 8) is provided in the terminal 6 and exhibits two cylindrically configured longitudinal grooves 41. A cylindrical pressure roll 42 is seated in the longitudinal grooves 41 and has a longitudinal recess 43 housing a thin rod 44 of an elastic foam material.

Figure 8:
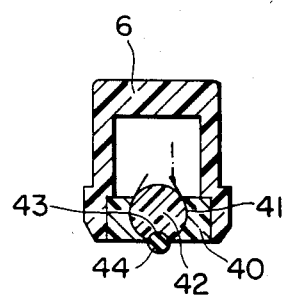
FIG. 8 shows the terminal of FIG. 7 in a cross section taken along line VIII—VIII in FIG. 7.
Figure 9:
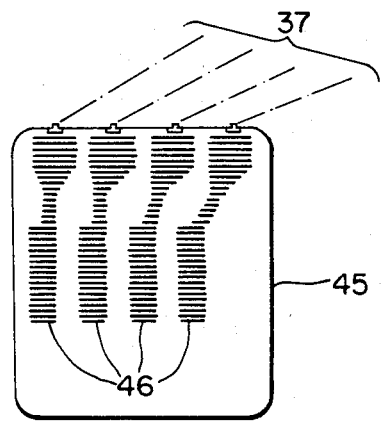
FIG. 9 shows a flexible circuit board of the terminal according to FIG. 8.

A flexible electric circuit board 45 (see FIG. 9) is placed around the pressure roll 42 of the terminal 6, as can be derived from FIG. 8. This circuit board 45 carries four conductor sections 46 of a flexible metal to which four connection lines 37 are soldered. With the terminal 6 being inserted in the cable clamp 5, the four conductor sections 46 touch the four contacts 17 arranged at the carrier tube 2, and the electrical connection is established by the elastic pressure exerted by means of the rod 44.

The conductor paths 15, the contacts 17, and the widened portions 20 are located on a flexible sheet 47 consisting of an electrically insulating material and cemented to the carrier tube 2 by means of a suitable adhesive; this sheet serves to accommodate all three components 15, 17, and 20.

A cylindrical cover lid 48 with a forward opening 49 threadedly connected to the front of the carrier tube 2 covers the bobbin 4.

| Summary of Reference Numerals Used | |
| --- | --- |
| 1 fine-lead unit | 25 spreader finger |
| 2 carrier tube | 26 recess |

-continued

| Summary of Reference Numerals Used | |
|---|---|
| 3 tubular handle | 27 shoulder |
| 4 bobbin | 28 pin |
| 5 cable clamp | 29 plug-in rim |
| 6 terminal | 30 sockets |
| 7 graphite lead | 31 induction coil |
| 8 lead storage chamber | 32 lead guide |
| 9 sliding and clamping means | 33 blind bore |
| 10 cap | 34 lead brake |
| 11 compression spring | 35 longitudinal slots |
| 12 three-jaw mounting | 36 opening |
| 13 centering sleeve | 37 connection lines |
| 14 plug contacts | 38 detent pin |
| 15 conductor paths | 39 indentation |
| 16 contact plate | 40 circuit board clamp |
| 17 contacts | 41 longitudinal groove |
| 18 contact and on-off switch | 42 pressure roll |
| 19 broadened portion | 43 longitudinal recess |
| 20 broadened portion | 44 rod |
| 21 contact pellet | 45 circuit board |
| 22 coil spring | 46 conductor sections |
| 23 turning ring | 47 sheet |
| 24 contact sleeve | 48 cover plate |
| | 49 opening |

What is claimed is:

1. Electronic stylus for digitizing devices, this stylus being connected to the digitizing device by means of electric connection lines, with a longitudinally displaceable marker tip, an electric contact switch, as well as a bobbin with an induction coil surrounding the marker tip, characterized in that the marker tip is fashioned as a pencil insert with advanceable graphite lead (7); that the bobbin (4) has a plug-in rim (29), exhibits electric sockets (30), contains a lead brake (34), and carries a lead guide (32); that a tubular handle (3) at least partially encompassing the stylus over its length is provided which actuates the contact switch and is longitudinally displaceable against the bias of a spring; and that a turning ring (23) is rotatably mounted to the tubular handle (3), this turning ring activating an electric on-off switch.

2. Electronic stylus according to claim 1, characterized in that the pencil insert is a fine-lead unit (1) with lead storage chamber (8) as well as a sliding and clamping means (9).

3. Electronic stylus according to claim 2, characterized in that the fine-lead unit (1) is seated in a carrier tube (2).

4. Electronic stylus according to claim 3, characterized in that a centering sleeve (13) made of an electrically insulating material is provided at one end of the carrier tube (2) and carries plug contacts (14).

5. Electronic stylus according to claim 4, characterized in that four electric conductor paths (15) are mounted in an insulated fashion on the carrier tube (2), these paths emanating from a contact plate (16) with four contacts (17).

6. Electronic stylus according to claim 5, characterized in that two conductor paths (15) are connected to the plug contacts (14).

7. Electronic stylus according to claim 5 or 6, characterized in that the on-off switch is combined with the contact switch and is formed by two broadened portions (19 and 20) of two conductor paths (15), lying side-by-side at a spacing from each other, an electrically conductive contact·pellet (21) sliding over these broadened portions, which pellet is seated in a contact sleeve (24) made of an insulating material and being attached to the turning ring (23).

8. Electronic stylus according to claim 5, characterized in that a cable clamp (5) U-shaped in cross section is pushed onto the carrier tube (2) in the zone of the contact plate (16) and encompasses the carrier tube (2), this cable clamp being provided with two longitudinal slots (35).

9. Electronic stylus according to claim 8, characterized in that a cable terminal (6) can be inserted in the cable clamp (5) wherein the electric connection lines (37) are soldered to a flexible circuit board (45), this board being placed around a pressure roll (42) situated in a circuit board clamp (40) with two longitudinal grooves (41), the pressure roll (42) carrying a longitudinal recess (43) in which is inserted a rod (44) of an elastic foam material.

* * * * *